Jan. 26, 1943.  O. J. SUNDSTRAND  2,309,282
COMPUTING MACHINE
Filed Dec. 24, 1938  5 Sheets-Sheet 1

INVENTOR
OSCAR J. SUNDSTRAND
BY
L. G. Julihn
ATTORNEY

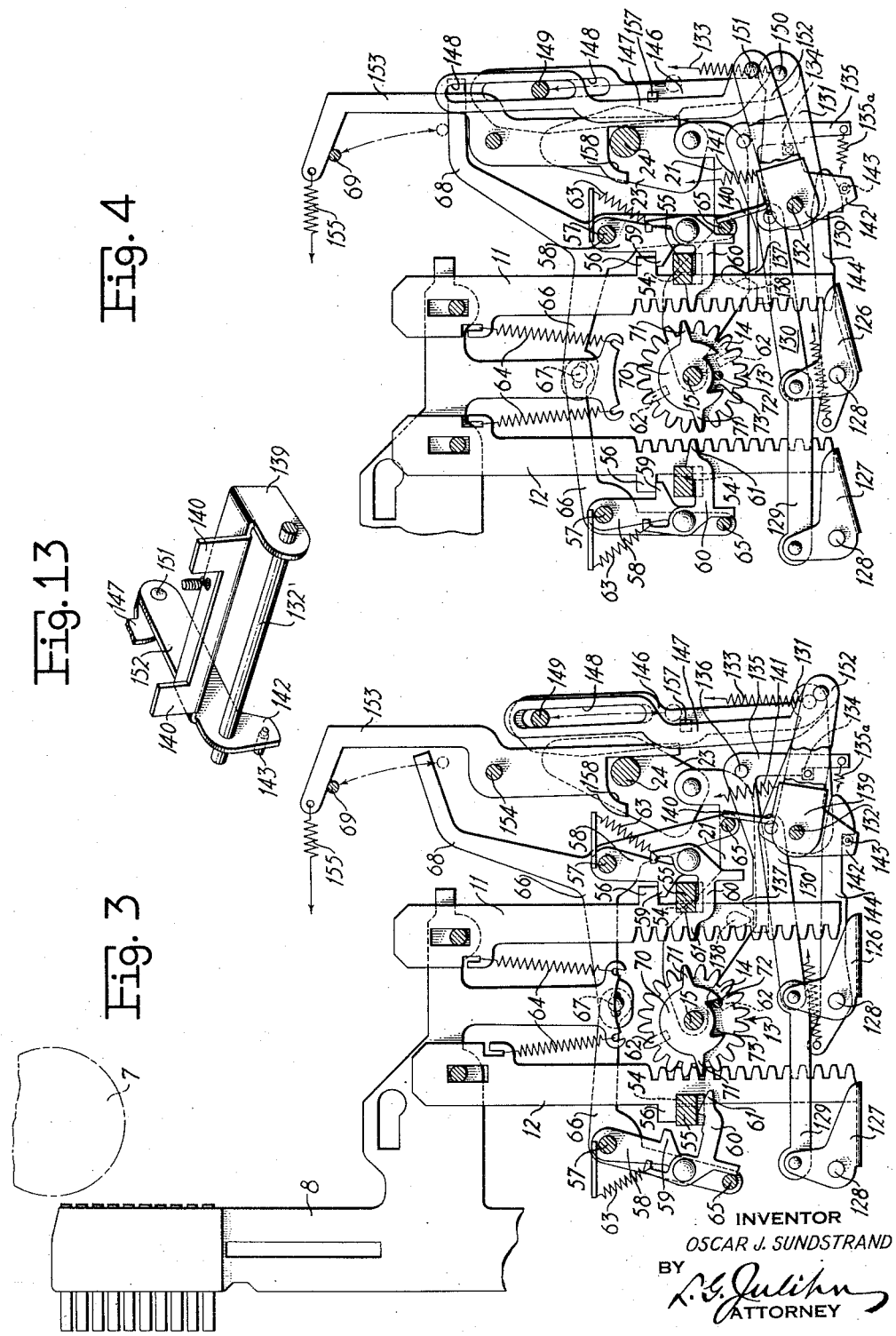

Jan. 26, 1943. O. J. SUNDSTRAND 2,309,282
COMPUTING MACHINE
Filed Dec. 24, 1938   5 Sheets-Sheet 3

INVENTOR
OSCAR J. SUNDSTRAND
BY
ATTORNEY

INVENTOR
OSCAR J. SUNDSTRAND
BY
ATTORNEY

Jan. 26, 1943.                O. J. SUNDSTRAND                2,309,282
                                COMPUTING MACHINE
                    Filed Dec. 24, 1938           5 Sheets-Sheet 5

INVENTOR
OSCAR J. SUNDSTRAND
BY
ATTORNEY

Patented Jan. 26, 1943

2,309,282

UNITED STATES PATENT OFFICE 2,309,282

COMPUTING MACHINE

Oscar J. Sundstrand, West Hartford, Conn., assignor to Underwood Elliott Fisher Company, New York, N. Y., a corporation of Delaware Application December 24, 1938, Serial No. 247,598

5 Claims. (Cl. 235—60)

This invention relates to computing machines, and more particularly to mechanisms for obtaining true negative totals from a single adding and subtracting totalizer.

It is well known that to obtain such a total on the type of machine illustrated here, it is necessary to introduce a quantity known commonly as a fugitive "1." This fugitive "1" may be introduced in different ways, the one being employed in the present instance operating as follows.

Whenever the totalizer is shifted from its adding position to its subtracting position, "1" is subtracted, and whenever it is returned from its subtracting position to its adding position, "1" is added. By doing this, if a total is taken when the totalizer is in its subtracting position (as is always the case in taking a negative total), the fugitive "1" is properly subtracted without any attention on the part of the operator.

It is also well known that to obtain a negative total without special attention on the part of the operator, it is necessary to have the shifting of the totalizer to its subtracting position controlled automatically by the totalizer (according to its positive or negative condition), this automatic control of the shifting being customarily performed during a blank cycle immediately following the entry of the last item.

In mechanisms of this character it is therefore necessary at times (when the last item was a positive entry, but the total is negative, or vice versa) to shift the totalizer during the blank cycle, the shifting incidentally causing the entry of the fugitive "1."

In many types of machines, the entry of a fugitive "1," or in fact the entry of any amount, may leave the actuating racks or transfer mechanism, or both, in a condition that is not proper for taking a total. It is, therefore, necessary in such machines to operate the machine through a second blank cycle before the total can be taken.

This requirement of two blank cycles prior to the taking of a total has been found very objectionable, especially in types of work necessitating the taking of totals at frequent intervals. It is, therefore, an object of the present invention to relieve this condition by providing a mechanism that will properly condition machines of this character for the taking of a negative total after one, instead of two blank cycles.

With this and incidental objects in view, the invention consists in certain novel features of construction and combinations of parts, the essential elements of which are set forth in appended claims, and a preferred embodiment of which is hereinafter described with reference to the drawings which accompany and form part of the specification.

In the drawings:

Figure 3 is a right side elevation of the totalizer and the fugitive "1" entering mechanism, showing the position of the parts immediately following the insertion of the fugitive "1,"

Figure 4 is a view similar to Figure 3 but with the parts restored,

Figure 12:
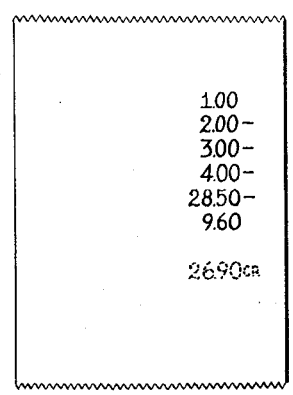
Figure 5:
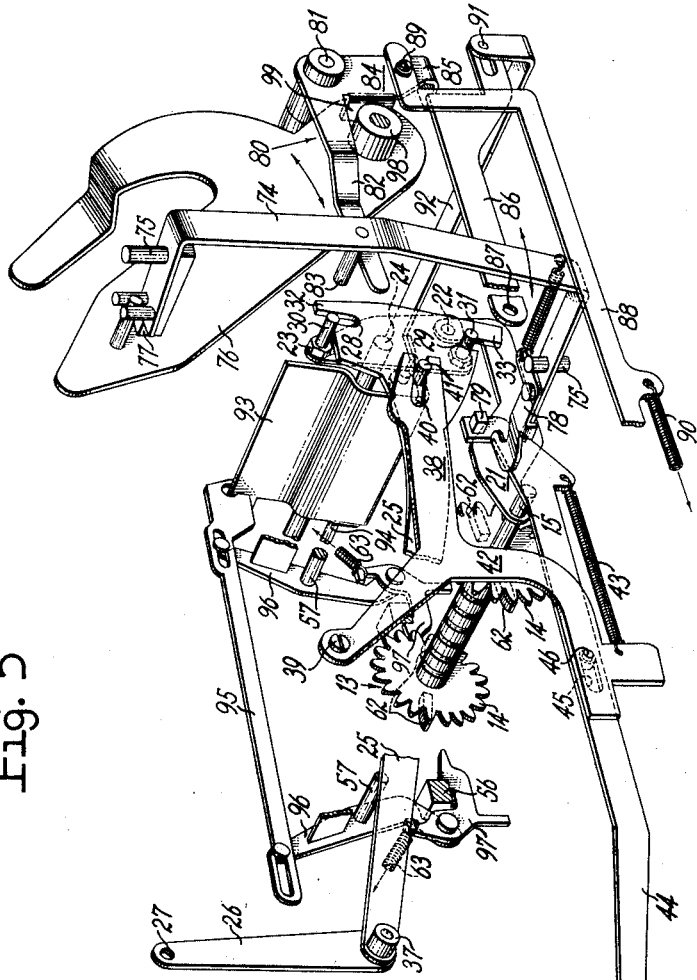
Figure 14:
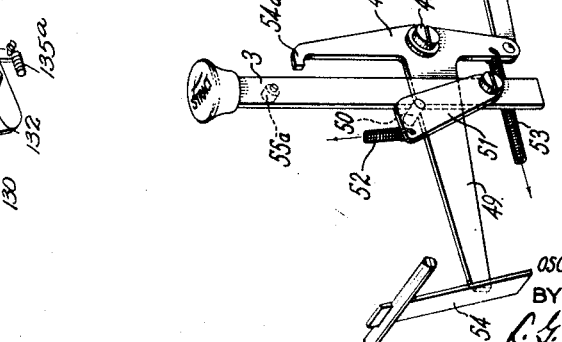
Figures 6, 7:
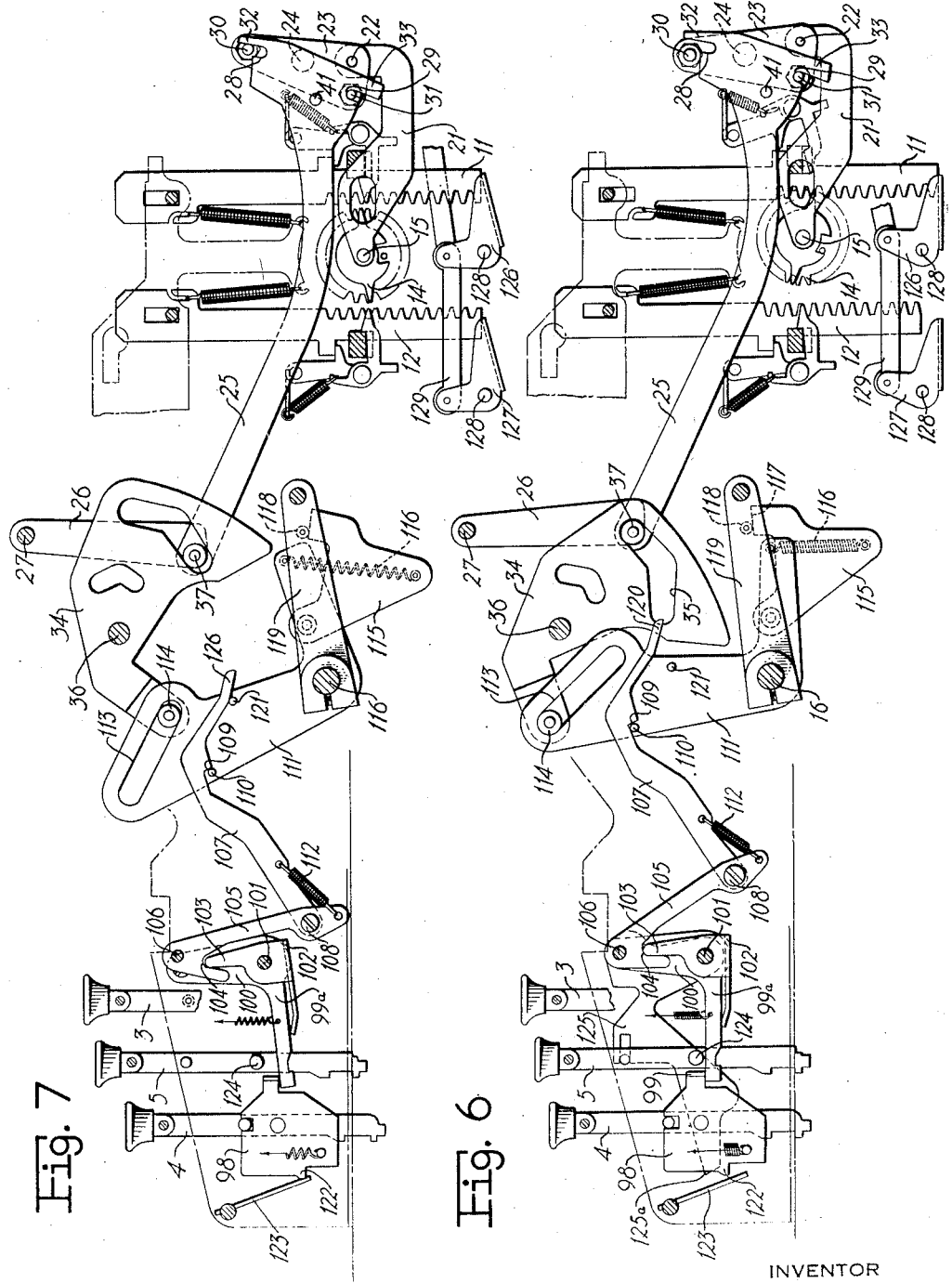
Figure 8:
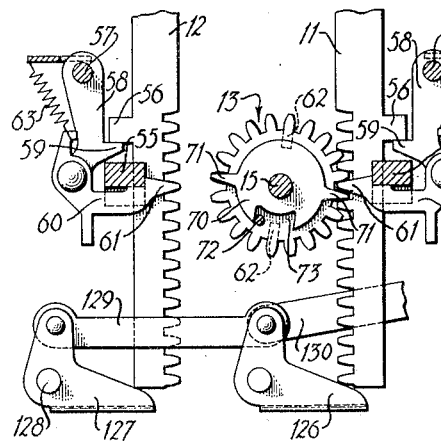
Figure 9:
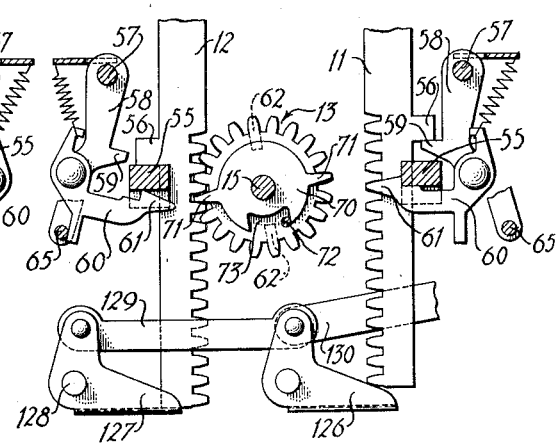
Figure 10:
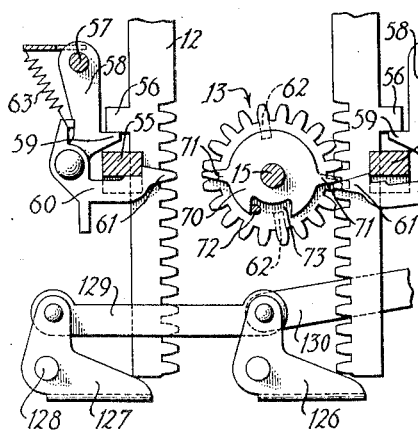
Figure 11:
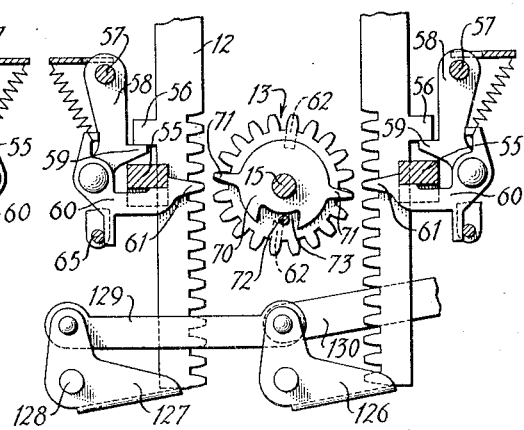

Figure 5 is a perspective of the mechanism for automatically conditioning the totalizer to take a negative total, Figure 6 is a right side elevation of mechanism used in restoring the racks and stop pawls, Figure 7 is a view similar to Figure 6 but with the parts in their actuated positions, Figure 8 is a diagrammatic view of the totalizer in condition to add an amount, Figure 9 is a view similar to Figure 8 but with the totalizer shown in subtractive condition, the fugitive "1" pawl having been tripped, Figure 10 is a view similar to Figure 9 but with the totalizer just about to be placed in adding condition during a blank cycle and just about to trip the mechanism for introducing the fugitive "1" additively, Figure 11 is a view similar to Figure 10 but showing the totalizer in neutral position and the units rack and fugitive "1" mechanism being restored by depression of a total key, Figure 12 shows a portion of a record strip illustrating the type of work done by the machine, Figure 13 is a perspective view of one of the parts shown in Figures 3 and 4, and Figure 14 is a perspective view of some of the parts shown in the lower right hand corner of Figures 3 and 4.

GENERAL DESCRIPTION

The invention is herein exemplified in connection with mechanism of the general character disclosed in the U. S. Patents No. 1,198,487, issued to Gustaf D. Sundstrand, and Nos. 1,583,102, 1,965,611, 2,004,495 and 2,088,982, issued to Oscar J. Sundstrand.

On this class of machine, accumulating operations are performed by indexing in the keyboard the amount that is to be listed and accumulated, and starting the machine by depressing the motor bar. Stops set by the amount keys arrest the type bars during their upward movement in positions wherein the numeral type corresponding to the amount indexed is in position to print. Adding and subtracting racks carried by the type bars are arranged for movement therewith.

Prior to the up-stroke of the racks in an accumulating cycle, the totalizer is moved to a neutral position intermediate the two sets of racks, and just prior to the down-stroke of the racks the totalizer is engaged with whichever set of racks is to be used in the accumulating operation.

An enforced blank cycle prior to a total cycle insures the resetting of any transfer pawls which may have been tripped during the preceding accumulating cycles, and automatically engages the totalizer with the proper set of racks in accordance with the positive or negative character of the total to be taken.

During the total cycle, the totalizer wheels are in mesh with the selected set of racks during the up-stroke of the latter. Therefore, as the transfer lugs carried by the wheels abut the under side of their associated transfer pawls, their corresponding type bars are arrested in position for printing the totals which have been accumulated in the totalizer.

Since an error of "1" occurs whenever the totalizer overdrafts, a means must be provided to correct this error. This means includes a tumbler arranged to be oscillated alternately clockwise and counter-clockwise, as the totalizer shifts from one set of racks to the other. Such movement of the tumbler causes it to trip a pawl associated with the units order rack of the set of racks engaged, whereby the units rack is permitted to descend a distance of one tooth to additively or subtractively accumulate, as the case may be, the fugitive "1" in the units wheel.

In the ordinary course of operations, this accumulation of the fugitive "1" trips one or more transfer pawls and actuating racks that are not restored until the next cycle. Further, it may happen that the amount of the last item of a group to be totaled is of opposite character to, and less than the aggregate amount of the preceding accumulated items. Under such a condition, when the machine is operated through the blank cycle to condition the totalizer for taking a total, the movement of the totalizer from one set of racks to the other causes the fugitive "1" pawl to trip and thereby introduce the necessary fugitive "1" as in the normal course of operations, but, since the entry of the fugitive "1" leaves one or more parts out of normal position, another blank cycle is necessary before the total can be taken.

To obviate the necessity of two blank cycles before taking a total, mechanism operable by depression of either the total or sub-total key, after a single blank cycle is taken, is provided to restore any racks or pawls that are out of normal position.

DETAILED DESCRIPTION

INDEX OF TOPICS

1. The machine sections and actuating mechanism generally.
2. Mechanism for shifting the totalizer.
3. Transfer mechanism generally.
4. Fugitive "1" entering mechanism.
5. Automatically conditioning the totalizer for taking a negative total.
6. Mechanism for restoring racks and stop pawls by depression of the total keys.

1. *The machine sections and actuating mechaism generally*

Figure 1:
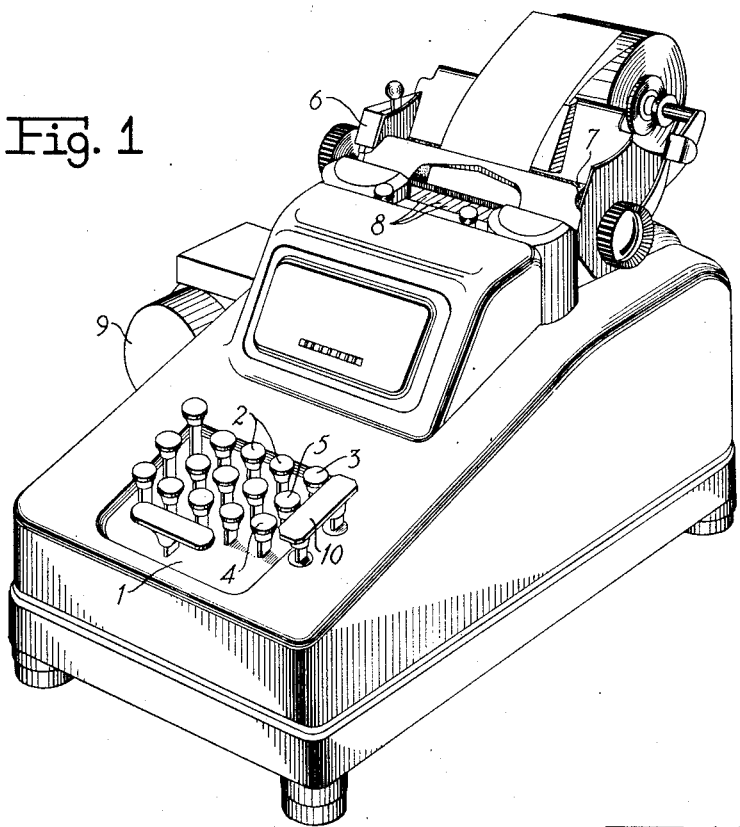
Figure 1 is a perspective view of a computing machine embodying the invention.
Figure 2:
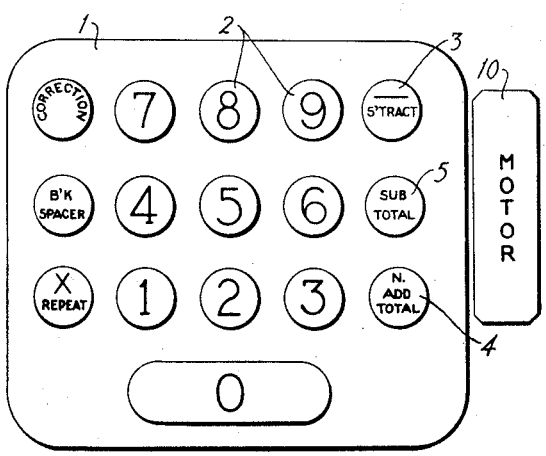
Figure 2 is a diagrammatic view of the keyboard thereof.

Referring to Figures 1 and 2, the machine includes the usual keyboard 1 having amount keys 2, a subtract key 3, total and sub-total keys 4 and 5, respectively, a carriage 6 supporting the platen 7 around which the paper is guided, type bars 8 for printing on the paper, a motor 9, and a motor bar 10.

Type bars 8 are arranged for vertical movement, and each carries a pair of depending actuating racks 11 and 12 (Figure 3) lying on opposite sides of the totalizer indicated generally at 13. The totalizer includes a plurality of 20-tooth wheels 14 (there being one wheel for each type bar 8), journaled for free rotary movement on a shaft 15. Shaft 15 is arranged to be shifted forwardly and rearwardly to engage wheels 14 with either of the sets of racks. The set of racks represented by rack 11 is effective to rotate the wheels in a clockwise direction for accumulation of additive amounts, and the set of racks represented by the rack 12 is effective to rotate the wheels in a counter-clockwise direction for the accumulation of subtractive amounts.

Normally, the wheels are engaged with adding racks 11. When an item indexed on keys 2 (Figure 1) is to be added, wheels 14 are moved to neutral position, i. e., between the two sets of racks, before type bars 8 are raised to print the item. The wheels are moved back into engagement with racks 11 just before the bars are moved downwardly. Addition, therefore, is accomplished on the downstroke of the racks, and the extent of rotation of the wheels 14 corresponds to the extent of rise of the type bars in accordance with the amount indexed.

Depression of subtraction key 3, following the indexing of an item, conditions mechanism that causes the wheels 14 to move from neutral position into engagement with subtraction racks 12 just before the latter descend, whereby subtraction of the item is accomplished on the downstroke.

To take a total, the total key 4 is depressed and the machine operated. During this operation, wheels 14 are engaged with the set of racks selected during the blank cycle preceding the total cycle, so that during the upstroke of the racks, the total is cleared from the wheels. They are withdrawn from engagement with the racks just before the racks descend, and are re-engaged at the very end of the operation.

Depression of sub-total key 3 conditions mechanism that allows wheels 14 to be engaged with the racks during the entire cycle, so that the amount taken from the wheels during the ascent of the racks is restored during the descent.

The machine is actuated by the motor 9. The motor is started by the closing of suitable switch mechanism, and is coupled with an actuating shaft 16 (Figure 6) by a suitable clutch mechanism upon depression of motor bar 10 (Figure 1). The actuating shaft is coupled with the motor drive in such a manner that it is rocked, first counter-clockwise (Figure 6) and then clockwise, about ninety degrees, to actuate the type bars 8 and impart the necessary movements to the key controlled mechanisms above described.

All the before-mentioned features are common to the Sundstrand patents mentioned above, and to which reference may be had for a more detailed description.

2. *Mechanism for shifting the totalizer*

The mechanism for moving wheels 14 into and out of mesh with racks 11 and 12 to accomplish the operations above outlined, is identical with that disclosed in the previously mentioned Patent No. 1,965,611. A pair of links, such as 21, (Figures 5 and 6) are pivoted on their forward ends to the opposite ends of shaft 15. The rear ends of links 21 are pivoted as at 22 to the lower ends of two levers, such as 23, which are rigidly secured to a shaft 24 journaled in the framework of the machine.

When levers 23 are in the position shown in Figures 5 and 6, wheels 14 are in mesh with adding racks 11. The means herein shown for swinging levers 23 to move the wheels into and out of mesh with the racks comprises a link 25, the forward end of which is supported by a lever 26 pivoted on a stud 27. The rear end of link 25 is provided with notches 28 and 29 to receive pins 30 and 31, respectively, on the opposite ends of the right hand lever 23. Rearwardly of the notches 28 and 29 are lugs 32 and 33, respectively, which serve to prevent disengagement of lever 23 from link 25. Forwardly of notches 28 and 29 are curved surfaces arranged to slide in contact with pins 30 and 31. Link 25 is moved forward and back by means of a cam plate 34 (Figure 6), pivoted at 36 and having a cam slot 35 therein, the upper portion of the slot being concentric with the axis 36 of the plate. On the forward end of the link 25 is a roller 37 that lies in slot 35. Cam 34 is arranged to be oscillated about its axis 36 during each cycle of the machine, by means of a reversible pawl mechanism (not shown) having connection with actuating shaft 16 as fully disclosed in Patent No. 1,965,611. By these parts, as cam 34 swings upwardly during the first half of the cycle, link 25 is drawn forwardly and levers 23 are swung clockwise about shaft 24, whereby wheels 14 are withdrawn from engagement with racks 11 before the latter rise; and when cam 34 swings downwardly, during the latter half of the cycle, link 25 is thrust rearwardly, whereby levers 23 are rocked counter-clockwise of shaft 24, and wheels 14 are brought into engagement with racks 11 before they descend, Link 25 is connected with subtraction key 3 by means of a lever 38 (Figure 5) pivoted at 39 in the machine frame. Lever 38 is provided at its rear end with a recess 40 arranged to embrace a pin 41 on link 25, and has a downwardly extending arm 42 carrying a pin 46 that lies in a slot 45 in a slide 44. A spring 43 connected between slide 44 and lever 38 normally tensions the pin against the rear end of slot 45. The forward end of slide 44 is pivoted to a depending arm of a lever 47 pivoted on a stud 48. Lever 47 has a forwardly extending arm 49 underlying a pin 50 in a plate 51 secured to the stem of the subtraction key 3. A spring 52 connected between plate 51 and the machine frame normally tensions key 3 upwardly, and a spring 53 connected between the lower arm of lever 47 and the machine frame normally tensions the lever clockwise about stud 48, so that arm 49 rests against pin 50. When the parts are in the normal position shown in Figure 5, tension of spring 53 urges slide 44 forwardly and causes lever 38 to hold notch 29 of link 25 in engagement with pin 31.

When an amount is to be subtracted, depression of key 3 rocks lever 47, which in turn thrusts slide 44 rearwardly, moving the rear end of slot 45 away from pin 46 and tensioning lever 38 upwardly. Then, when levers 23 are rocked clockwise at the beginning of the cycle, and notch 28 is brought opposite pin 30, lever 38 thrusts link 25 upwardly, so that this notch and pin engage, as notch 29 disengages from pin 31.

Hence, as cam 34 (Figure 6) starts to rock downwardly at the beginning of the second half of the cycle, levers 23 are rocked clockwise of shaft 24 instead of counter-clockwise and wheels 14 are engaged with subtraction racks 12 instead of adding racks 11.

A latch indicated at 54 (Figure 5) is provided to maintain lever 47 and the associated parts in their operated positions to effect this result, a hook 54ᵃ on lever 47 engaging a stud 55ᵃ on the key stem to hold the key depressed. At the completion of the cycle, latch 54 is released, allowing the parts to restore under the influence of their respective springs.

If, on the ensuing cycle, key 3 is again depressed, wheels 14 are disengaged from racks 12 at the beginning of the cycle and are re-engaged with them at the beginning of the second half of the cycle, as before. In the event key 3 is not depressed for the ensuing cycle, link 25 ceases to be tensioned upwardly. Hence, when wheels 14 are disengaged from racks 12 at the beginning of the cycle, notch 29 re-engages pin 21, so that wheels 14 are engaged with racks 11 instead of racks 12 during the latter portion of the cycle.

When a total is to be printed, wheels 14 are retained in mesh (except for a brief interval to be later explained) with the set of racks with which they were left engaged at the completion of the blank cycle preceding the total cycle, so that the wheels may be turned to zero during the first half of the machine cycle. At the beginning of the last half of the cycle, cam 34 is rocked counter-clockwise to withdraw wheels 14 from engagement with the racks, so that they may remain cleared. However, if a sub-total is being taken, cam 34 is not rocked at the beginning of the second half of the cycle, and wheels 14 therefore remain engaged with the racks, so that during the downstroke the amount of the total which has been printed is returned to the totalizer.

3. *Transfer mechanism generally*

Referring now particularly to Figure 3, the sets of racks 11 and 12 are connected to type bars 8 by individual pin-and-slot connections that permit one step of movement of each rack relative to its type bar. The racks are guided for vertical movement in slots 54 formed on inwardly facing surfaces of a pair of similar bars 55 (Figure 3), which extend longitudinally of the totalizer and which are supported in the machine frame.

Each rack is provided with a lug 56 which moves in the vertical plane of its respective bar 55, and which is arranged to be arrested by the bar to define the lowermost position of the racks.

Two rods 57 are supported in the machine frame at opposite sides of the two sets of racks, and operatively support a plurality of stop pawls 58, one such pawl being provided for each rack. Each pawl 58 is formed with a lug 59 arranged to co-act with lugs 56 on their respective racks to support the latter one step of movement above bars 55. To the lower end of each pawl 58 is pivoted a dog 60, having a tooth 61 engaging the edge of the adjacent bar 55.

Each of the wheels 14 has two diametrically opposed lugs 62 fixed to one side thereof and which are arranged to disengage the teeth 61 from the bar 55. When an amount registered by a wheel reaches nine, continued rotation of that wheel as its rack descends brings one of the lugs 62 against the upper edge of the end of the dog 60 associated with the next higher order rack, thereby depressing the dog until its tooth 61 is clear of the bar 55, whereupon a spring 63 (assisted by the downward pressure of a spring 64 of the said next higher order rack) moves the dog and pawl 58 away from the higher order rack, the latter then being free to drop the one tooth space, where it is stopped by contact of its lug 56 with bar 55.

Any transfer elements that are tripped during one cycle of the machine are normally restored during the next cycle. The pawls 58 and dogs 60 are restored by a pair of rods 65 lying adjacent the dogs 60. Each rod 65 is supported by two bell crank levers, such as 66, pivoted on rods 57. The bell crank levers are connected for simultaneous swinging movement by a pin-and-slot connection 67. The rods 65 are simultaneously moved toward and away from their associated dogs 60 by operation of two arms, such as 68, that are formed integrally with the right hand set of bell crank levers 66. A rod 69 (216 in Patent No. 1,965,611), lying in the transverse plane of arms 68, is arranged for downward movement (as indicated by arrow) during the first half of each machine cycle. Such downward movement of this rod causes it to abut arms 68 and thereby rock bell crank levers 66 about their pivots to swing rods 65 inwardly, as shown in Figure 4, to restore any pawls 58 and dogs 60 that have been tripped. This restoring action takes place at a point in the machine cycle where any dropped bars will have been raised, so that their lugs 56 are above the lugs 59 of pawls 58 when the latter are restored.

The movement imparted to the type bars during a blank cycle prior to the taking of a total raises lugs 56 sufficiently to permit the restoration of stop lugs 59.

This construction is common to the Sundstrand patents previously mentioned.

4. Fugitive "1" entering mechanism

As previously stated, whenever a totalizer of the type used in the present construction is changed from a positive to a negative condition, or vice versa, an error of "1" occurs in the accumulated total. To correct this, mechanism is provided to enter "1" in the units wheel 14 every time the totalizer is shifted from the adding racks to the subtracting racks, or vice versa, so that when a total is taken by one or the other set of racks, the fugitive "1" will have been entered. This mechanism includes a tumbler 70 (Figure 3) which is rotatably mounted on shaft 15 immediately adjacent the units order wheel 14. Tumbler 70 is provided with oppositely disposed lugs 71, arranged to engage teeth 61 of the dogs 60 that are connected with the pawls 58 associated with the units order racks 11 and 12.

A stationary pin 72 is held by the machine frame at a point midway between racks 11 and 12, and projects inwardly into a recess 73 provided in tumbler 70. Movement of the totalizer from engagement with adding racks 11, as shown in Figure 8, past neutral position and into engagement with subtracting racks 12, as shown in Figure 9, causes the right end of recess 73 to strike pin 72 and rock tumbler 70 counterclockwise about shaft 15 a distance sufficient to cause lug 71 to release dog 60 on the left from engagement with bar 55. This removes stop pawl lug 59 from beneath lug 56 and allows the units rack 12 to descend one step to subtractively accumulate the fugitive "1" in the units order wheel 14. Upon shifting the totalizer from engagement with subtracting racks 12, as shown in Figure 9, past neutral position and into engagement with adding racks 11, the beginning of which movement is illustrated in Figure 10, the left end of recess 73 strikes pin 72 and rotates tumbler 70 clockwise about shaft 15, causing the opposite lug 71 to disengage the dog 60 on the right from bar 55 to additively accumulate the fugitive "1" in the units order wheel 14. It will be noted with reference to Figures 10 and 11 that recess 73 is made sufficiently wide so that no rotative movement is imparted to tumbler 70 when the totalizer is moved merely to neutral position from engagement with either set of racks. The tripped stop pawl 58 and its associated dog are restored during the next cycle by the transfer restoring mechanism described in the preceding section.

5. Automatically conditioning the totalizer for taking a negative total

A mechanism similar to that disclosed in Patent No. 2,088,982 is provided on this machine to insure the engagement of the totalizer with the subtracting racks during the blank cycle preceding the taking of a total, in the event that the totalizer has become overdrafted, i. e., credit amounts accumulated have exceeded debit amounts.

This mechanism includes a bail 74 (Figure 5), the upper and lower arms of which are pivoted on studs 75 secured in the machine frame. The upper arm of the bail has a universal connection with a lever 76 pivoted on an axis 77. Lever 76 has a suitable crank connection (not shown) with rock shaft 16 (Figure 6) whereby during each cycle of the machine the lever is swung to and fro about axis 77 and oscillates bail 74. The lower arm of the bail carries a yielding projection 78 arranged to lie directly in front of a stud 79 fixed in slide 44, whenever the bail is elevated a slight distance on studs 75. The means for so elevating bail 74 comprises a bell crank 80 pivoted on a stud 81 and having a horizontal arm 82 underlying a pin 83 secured to the bail. A vertical arm 84 of the bell crank has an inturned flange 85 that normally, during each cycle of the machine, abuts a stop lever 86 pivoted as at 87 in the machine frame. A link 88 (numbered 1076 in Patent No. 2,088,982), pivoted on a stud 89 secured in arm 84, has connected thereto a spring 90 which tensions flange 85 toward stop lever 86.

The rear end of lever 86 is forked and embraces a pin 91 fixed in an extension 92 of a plate 93 mounted for pivotal movement on a rod 94 supported in the machine frame. The upper edge of plate 93 is embraced by a forked end of a link 95, which is connected by pin-and-slot connections with arms 96 pivoted on rods 57. Each arm 96 is provided with a dog 97, similar to the dogs 60, and which is arranged to be disengaged from its bar 55 by lugs 62 of the totalizer wheel 14 of highest order. A roller 98 on the lower end of lever 76 is arranged to bear against a flange 99 provided on arm 84 of bell crank 80 and hold flange 85 a short distance away from stop lever 86 when lever 77 is in its normal position shown in Figure 5. When an amount accumulated in the totalizer represents a debit balance the parts are in the position shown in Figure 5. However, when the totalizer is overdrafted, the wheel 14 of highest order passes through zero, causing lug 62 to trip dog 97 on the subtract side of the totalizer and to swing arm 96 clockwise about rod 57 under tension of spring 63. This movement thrusts link 95 toward the right as viewed in Figure 5, rocks plate 93 clockwise about rod 94 and swings stop lever 86 downwardly about its pivot 87, out of the path of flange 85 of bell crank 84. Now, if a blank cycle is taken to condition the machine for a total operation, as roller 98 moves away from flange 99 at the beginning of the cycle, bell crank 84 is free to swing clockwise about stud 81, and arm 82 elevates bail 74, bringing projection 78 into the plane of stud 79. Clockwise oscillation of bail 74 then causes the projection to abut the stud and thrust slide 44 rearwardly to tension lever 38 upwardly. Hence, when levers 23 rock clockwise following the movement of the parts as just described, notch 28 of link 25 engages pin 30 in the same manner as previously described. Therefore, wheels 14 are placed in engagement with subtraction racks 12 at the beginning of the last half of the cycle, preparatory to the taking of the negative total on the succeeding cycle. At the end of the second half of the blank cycle, roller 98 again contacts flange 99 and rocks bell crank 84 counterclockwise to its normal position.

Mechanism similar to that disclosed in Patent No. 2,088,982 is provided on the forward end of link 88 to prevent the link from coming forward when an amount is indexed in the keyboard, so that even though stop lever 86 is lowered out of the path of flange 85 by virtue of the presence of a negative balance in the totalizer, the latter will not be automatically engaged with the subtraction racks for the accumulating operation.

6. *Mechanism for restoring racks and stop pawls by depression of the total keys*

The automatic shifting of the totalizer from one set of racks to the other in accordance with the nature of the total to be taken occurs during the blank cycle as above described, and causes tumbler 70 to trip the fugitive "1" pawl of the set of racks engaged, to correct the error of "1" as described above. However, since this insertion of the fugitive "1", like an ordinary transfer from one order to the next, leaves one or more of the actuating racks and transfer dogs out of normal position, a second blank cycle must be taken before the total, unless some other means is provided to restore these parts.

A means to restore these parts without requiring a second blank cycle is provided in the present mechanism, and is operable by depression of either of the total keys. By this mechanism, depression of either total key withdraws totalizer 13 from engagement with the racks, restores any racks and dogs that are out of normal position, and re-engages the totalizer with the set of racks from which it was disengaged.

Referring to Figure 6, total key 4 has secured on its stem a plate 98 having a lug 99 overlying a forwardly extending arm 99a of a bell crank 100 pivoted on a stationary rod 101. A bail 102 likewise pivoted on rod 101 has a horizontal arm lying beneath arm 99a and a vertical arm 103 engaging a recess 104 in a lever 105 pivoted on a stud 106. A pawl 107 is pivoted at 108 to lever 105 and has a shoulder 109 engaging a pin 110 on a cam lever 111 journaled on rock shaft 16. A spring 112 connected between lever 105 and pawl 107 normally tensions the pawl clockwise about pivot 108 and holds shoulder 109 in contact with pin 110. Cam lever 111 is provided with a slot 113 embracing a roller 114 on cam plate 34. The lower arm of cam lever 111 has pivoted thereon a plate 115 tensioned counter-clockwise about its pivot by a spring 116, so that a projection 117 thereof bears against a pin 118 on a crank arm 119 secured to rock shaft 16. The rear end of pawl 107 has an extension 120 lying in the path of a pin 121 on lever 111. Depression of total key 4 rocks bell crank 100 and bail 102 counterclockwise, and thereby swings lever 105 clockwise about pivot 106, causing pawl 107 to rock lever 111 counter-clockwise about shaft 16. This movement causes cam plate 34 to rock counterclockwise about its axis 36 and pull link 25 forward to shift totalizer 13 to neutral position as shown in Figure 7. During this movement, spring 116 is stretched to place clockwise tension on lever 111, plate 115 being held by projection 117 abutting pin 118. The counterclockwise movement of lever 111 progresses until pin 121 strikes projection 120 of pawl 107, whereupon shoulder 109 is removed from engagement with pin 110. This releases lever 111 to the action of spring 116, the latter pulling the lever clockwise to re-engage totalizer 13 with the set of racks from which it was just withdrawn.

Depression of key 4 causes a lug 122 on plate 98 to engage a latch indicated at 123 to hold the total key depressed and maintain other parts (not shown) associated with the total taking mechanism in moved position. At the end of the ensuing total cycle latch 123 is removed, in the manner disclosed in Patent No. 1,965,611, and the parts are restored under tension of their respective springs, whereupon shoulder 109 again engages pin 110.

A stud 124 secured in the stem of the sub-total key 5 overlies arm 99a of bell crank 100, so that depression of this key, also, imparts movement to the foregoing train of parts and effects a momentary disengagement of totalizer 13 from racks 11 or 12. An arm 125 (Figure 6), having pin-and-slot connections with sub-total key 5, is pivoted on rod 101 and has a forward projection 125a arranged to be engaged by latch 123 to hold this key depressed during the ensuing total cycle.

Mechanism is provided for restoring any dropped racks 11 or 12 and their associated stop pawls 58 and dogs 60 while the totalizer is momentarily disengaged from the racks.

This mechanism includes a pair of cradles 126 and 127 spanning the lower ends of the racks 11 and 12 respectively, and pivotally mounted on rods 128 fixed in the machine frame. A link 129 (Figure 3) connects the cradles for parallel uniform rocking movement about rods 128. A link 130 is connected at one end to cradle 126 and at its opposite end to an actuating arm 131 journaled on a stationary rod 132 secured in the machine frame. A spring 133 connected between arm 131 and the machine frame normally tensions the arm counter-clockwise about rod 132, causing a square stud 134 fixed thereon to engage a shoulder provided in the vertical arm of a latch 135 pivoted on a stud 136. A spring 135a, connected between latch 135 and the machine frame, maintains the latch in its effective position shown in Figure 3. In this position, an upstanding beveled lug 137, formed on a horizontal arm of latch 135, lies in the path of a correspondingly beveled stud 138 secured in the left totalizer shifting link 21. A bail 139 (see also Figure 13), also journaled on rod 132 adjacent arm 131, has a depending arm 142 carrying a pin 143 arranged to be engaged by a spring tensioned latch 144 pivoted on rod 128 between the upstanding sides of cradle 126, whereby the bail is held against counter-clockwise movement about rod 132 under tension of a spring 141 connected between the bail and the machine frame. A pair of upstanding flanges, such as 140, provided on the bail, are arranged to rest against the stop pawl restoring rod 65 when the bail is so latched.

When totalizer 13 is shifted to neutral position by depression of total keys 4 or 5, as above described, stud 138 bears against lug 137 and cams latch 135 counter-clockwise about rod 136, against the tension of spring 135a. This disengages the latch from stud 134 and releases arm 131 to swing counter-clockwise about rod 132 under tension of spring 133 to thrust link 130 toward the left, whereupon cradles 126 and 127 are rocked counter-clockwise about rods 128 and restore any dropped racks. During this movement, the right edge of cradle 126 strikes the lower edge of latch 144 and releases it from engagement with pin 143, whereupon bail 139 swings counter-clockwise about rod 132 under tension of spring 141, and flanges 140 thrust stop pawl restoring rods 65 inwardly toward the racks to restore any tripped dogs 60 and stop pawls 58.

The movements just described are practically instantaneous, all taking place while the totalizer 13 remains in neutral position, and before it re-engages the racks. It is apparent that stud 138 will effect release of latch 135 by movement of link 21 in either direction, i. e., whenever the link is shifted from the racks 12 to neutral position, or from the racks 11 to neutral position, so that this restoring means is effective to either additively or subtractively complete the accumulation of a fugitive "1" inserted during a blank cycle.

Means are provided for resetting cradles 126 and 127 and stop pawl restoring bail 139 on the first succeeding accumulating cycle. This means includes a pair of upstanding links 146 and 147 having slots 148 through which passes a rod 149 (15 in Patent No. 1,965,611). The link 146 is pivoted at 150 to arm 131, and link 147 is pivoted at 151 to an arm 152 on bail 139. Rod 149, by suitable connections (not shown) with the main rock shaft 16 (Figure 6) is arranged to move, during each machine cycle, downwardly from its normal position shown in full lines in Figure 3 during the first half of the cycle, to a position shown in dotted lines in this figure, and back to normal position during the last half of the cycle. Referring now to Figure 4, it is seen that such downward movement thrusts links 146 and 147 downwardly, rocking arm 131 and bail 139 clockwise about rod 132 against the tension of their respective springs, and restoring cradles 126 and 127 to the position shown in Figure 3, latch 135 re-engaging stud 134 and latch 144 re-engaging pin 143.

Since, in the normal course of machine operations stud 138 strikes lug 137 and disengages latch 135 whenever totalizer 13 is moved to neutral position, and since this would effect undesirable results, means must be provided to prevent the release of rack restoring cradles 126 and 127 and stop pawl restoring bail 139 incident to the tripping of latch 135 during these operations.

This means includes a stop arm 153 journaled on a rod 154 and situated between links 146 and 147. A spring 155 connected to the upper end of the stop arm normally tensions the arm counter-clockwise about rod 154 and against rod 69. The lower end of arm 153 moves in the plane of a square stud 157 fixed in link 146, and a yoke 158 of arm 153 straddles shaft 24. At the beginning of each cycle of the machine, as rod 69 swings downwardly from the full line position shown in Figure 3 to the dotted line position, arm 153 swings counter-clockwise about rod 154 the limited extent permitted by yoke 158. This amount of movement is sufficient to bring the lower end of arm 153 directly over stud 157. Consequently, since this occurs at the very beginning of the cycle, by the time the totalizer has been shifted to neutral position, and latch 135 released, arm 153 prevents arm 131 from rising, and thereby prevents actuation of restoring cradles 126, 127 and 139.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

What is claimed is:

1. In a machine of the class described, a totalizer, actuating racks therefor, a total key, means actuated by operation of the total key to disengage the totalizer from the racks, means to thereafter relieve the totalizer of control by the total key, and a spring, tensioned by operation of the total key, to return the totalizer to engagement with the racks.

2. In a machine of the class described, a totalizer, actuating racks therefor, a total key, means actuated by operation of the total key to disengage the totalizer from the racks, means to thereafter relieve the totalizer of control by the total key, tens transfer elements movable into tripped and normal positions, means to move any tripped transfer elements into normal position after the totalizer is disengaged from the racks, and a spring tensioned by operation of the total key to then return the totalizer to engagement with the racks.

3. In a machine of the class described, a totalizer, actuating racks therefor, a total key, means actuated by operation of the total key to disengage the totalizer from the racks, transfer elements, each movable under tension of a separate spring from normal to tripped positions under control of the totalizer wheels, spring actuated means for returning any tripped transfer elements to their normal positions against the tension of their springs, a latch to hold the transfer element restoring means in ineffective position, and an operative connection from the totalizer disengaging means to the latch to trip the latch when the totalizer is moved into disengaged position.

4. In a machine of the class described, a totalizer, actuating racks therefor movable to normal and tens transferring positions, a total key, means actuated by the total key to disengage the totalizer from the racks, spring actuated means for returning the racks from their tens transferring positions to their normal positions, a latch to hold the rack returning means in ineffective position, and an operative connection from the totalizer disengaging means to the latch to trip the latch when the totalizer is moved into disengaged position.

5. In a key set, motor operated machine of the class described, a totalizer, actuating racks therefor, a total key, and mechanical means, actuated entirely by the energy applied by the operator in operating the total key, for disengaging the totalizer and actuating racks, and means also actuated by the energy applied through the key to restore a part of said means to initial position to reengage said totalizer and actuating racks.

OSCAR J. SUNDSTRAND.